(12) United States Patent
Bolgarin et al.

(10) Patent No.: US 11,551,464 B2
(45) Date of Patent: Jan. 10, 2023

(54) LINE BASED MATCHING OF DOCUMENTS

(71) Applicant: SAP SE, Walldorf (DE)

(72) Inventors: Alexander Bolgarin, Walldorf (DE); Oleg Bolgarin, Walldorf (DE); Jan Schrage, Helmstadt-Bargen (DE)

(73) Assignee: SAP SE, Walldorf (DE)

(*) Notice: Subject to any disclaimer, the term of this patent is extended or adjusted under 35 U.S.C. 154(b) by 279 days.

(21) Appl. No.: 17/075,962

(22) Filed: Oct. 21, 2020

(65) Prior Publication Data

US 2022/0121846 A1 Apr. 21, 2022

(51) Int. Cl.
| | |
|---|---|
| *G06V 30/418* | (2022.01) |
| *G06F 16/93* | (2019.01) |
| *G06N 20/00* | (2019.01) |
| *G06K 9/62* | (2022.01) |
| *G06V 30/412* | (2022.01) |

(52) U.S. Cl.
CPC .......... *G06V 30/418* (2022.01); *G06F 16/93* (2019.01); *G06K 9/6256* (2013.01); *G06N 20/00* (2019.01); *G06V 30/412* (2022.01)

(58) Field of Classification Search
None
See application file for complete search history.

(56) References Cited

U.S. PATENT DOCUMENTS

| | | | |
|---|---|---|---|
| 2003/0195836 A1* | 10/2003 | Hayes | G06Q 40/00 705/40 |
| 2008/0208780 A1* | 8/2008 | Hoopes | G06Q 10/10 706/15 |
| 2021/0374479 A1* | 12/2021 | Zambetti, Jr. | G06K 9/6262 |

* cited by examiner

*Primary Examiner* — Dov Popovici
(74) *Attorney, Agent, or Firm* — Buckley, Maschoff & Talwalkar LLC (57) ABSTRACT

Provided is a system and method for matching documents by line item. In one example, the method may include receiving a target document from a target system and a source document from a source system which are linked, identifying a set of lines in the target document and a set of lines in the source document which cannot be matched based on initial conditions, determining, via a machine learning model, a target line from the identified set of lines in the target document matches a source line from the identified set of lines in the source document based on descriptions included in the target line and the source line, and updating the source system to indicate that the target line from the target document and the source line from the source document are a match.

20 Claims, 9 Drawing Sheets

| Item | Item A | Item B | Item C |
|---|---|---|---|
| Item X | 95% | 83% | 43% |
| Item Y | 45% | 81% | 70% |
| Item Z | 17% | 45% | 83% |

| Item | Item A | Item B | Item C |
|---|---|---|---|
| Item Y | 45% | 81% | 70% |
| Item Z | 17% | 45% | 83% |

LINE BASED MATCHING OF DOCUMENTS

BACKGROUND

When an electronic document with multiple line items is associated with a transaction (e.g., a purchase order, goods receipt etc.) in a different system, it can be difficult to match line items from the electronic document and the transaction. For example, the systems may use different terms when describing objects within the documents, different languages, different data fields, and the like. To further complicate matters, an organization may generate thousands of documents (e.g., invoices, orders, accounting, etc.) a week. As one use case, an organization may sell motors for automobiles. In this case, it may be common for the organization to sell a predetermined quantity of motors (e.g., 1, 5, 10, 25, 100, etc.) at predetermined prices. As a result, simply matching one or a few data values between line items (e.g., part number, price, quantity, etc.) may not be enough to accurately match the other lines of the two documents together. As a result, it is common for a user to read/inspect each document and perform a matching process. When there are dozens or even hundreds of possible matches, it can take a user a significant amount of time before making a final decision.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

Due to the accessibility and ease in data management, many organizations are turning to remote service providers for managing data (e.g., documents, invoices, purchase orders, records, etc.). For example, enterprise resource planning (ERP) is an integrated management of business processes (e.g., a suite of software applications) that an organization can use to collect, store, manage, and interpret data from their business activities. ERP applications may share data across different departments such as manufacturing, purchasing, sales, accounting, and the like. One common use for ERP application is for maintaining purchase orders and the corresponding data that goes with such orders (e.g., invoices, tax forms, accounting documents, etc.)

One common requirement of such ERP systems is to link incoming invoices (i.e., electronic invoices) from a seller to a purchase order (e.g., goods receipt or invoice) of a buyer. Here, a purchase order may be placed by the buyer with the seller at a first point in time. Subsequently, the products (e.g., goods, services, etc.) may be shipped or otherwise performed at a later date at which time an electronic invoice (e-invoice) is generated and provided from the seller to the buyer. At this time, the buyer may verify the goods in the e-invoice against the previously submitted purchase order. Often, this process is performed on behalf of the buyer to provide proof of the purchase for various reasons (e.g., taxes, accounting, etc.)

In many cases, the number of items in a purchase order can be in the hundreds or even thousands. The incoming e-invoice does not generally have the same data fields or descriptions as the purchase order on a line-by-line (line item) basis. Therefore, a user is required to read data from the seller's invoice and identify a corresponding purchase order in the buyer's system. The user is then required to match each line in the invoice with a corresponding line in the purchase order, because each line is essentially its own individual transaction. Buyer's may receive dozens, hundreds, or even thousands of invoices a day. As a result, the conventional method of document matching can take a significant amount of time.

The example embodiments overcome these drawbacks with a matching process that works on a line item basis. For example, a host system may receive a target document (e.g., an e-invoice) from a target system. Here, the host system may read data from the target document and match the target document to a source record (e.g., document, file, table, etc.) in a source system (e.g., a purchase order in a buyer's system). Furthermore, the host system may attempt to match lines in the target document with lines in the source document using initial conditions. The initial conditions may be looking for "exact" matches in line item content, or similar enough (e.g., known replacement words, etc.) that there is little or no chance for error.

However, there may be a set of lines in the target document and a set of lines in the source document that cannot be matched. In this case, the host system may implement a machine learning model which can predict the likely matches between the two sets of lines. In particular, the machine learning algorithm may use a classification algorithm (e.g., a Bayes classifier, etc.) which learns from (i.e., is trained on) historical line item matches. In some cases, multiple lines from the target document may be "good" matches for multiple lines in the source document. In this case, the host system can further perform conflict resolution to reduce the possible candidates, and perform final matching.

Generally, the incoming e-invoice does not have enough data in common with the corresponding purchase order to perform "automated" matching for all lines in each document. The example embodiments address this by using automated matching at first, then using machine learning second. Another benefit of this process is that the number of candidates to be considered by the machine learning can be significantly reduced by the line items that have already been matched, and the line items remaining to be matched (obtainable from the purchase order). By reducing the line items that need to be considered by the machine learning algorithm, the speed of the matching is very efficient, and the accuracy is significantly improved.

Figure 1:
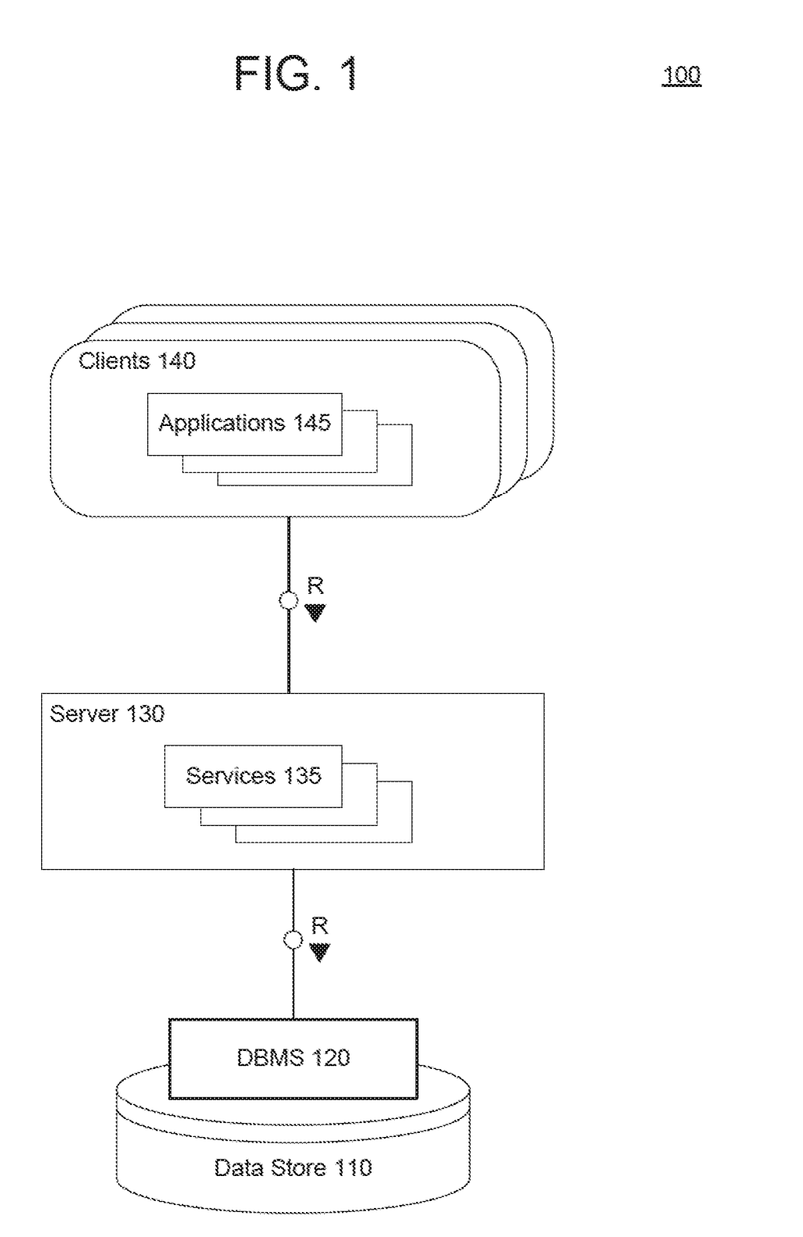
FIG. 1 is a diagram illustrating a database system architecture in accordance with an example embodiment.

FIG. 1 illustrates a system architecture of a database 100 in accordance with an example embodiment. It should be appreciated that the embodiments are not limited to architecture 100 or to a database architecture, however, FIG. 1 is shown for purposes of example. Referring to FIG. 1, the architecture 100 includes a data store 110, a database management system (DBMS) 120, a server 130, services 135, clients 140, and applications 145. Generally, services 135 executing within server 130 receive requests from applications 145 executing on clients 140 and provides results to the applications 145 based on data stored within data store 110. For example, server 130 may execute and provide services 135 to applications 145. Services 135 may comprise server-side executable program code (e.g., compiled code, scripts, etc.) which provide functionality to applications 145 by providing user interfaces to clients 140, receiving requests from applications 145 (e.g., drag-and-drop operations), retrieving data from data store 110 based on the requests, processing the data received from data store 110, and providing the processed data to applications 145.

In one non-limiting example, a client 140 may execute an application 145 to perform visual analysis via a user interface displayed on the client 140 to view analytical information such as charts, graphs, tables, and the like, based on the underlying data stored in the data store 110. The application 145 may pass analytic information to one of services 135 based on input received via the client 140. A structured query language (SQL) script may be generated based on the request and forwarded to DBMS 120. DBMS 120 may execute the SQL script to return a result set based on data of data store 110, and the application 145 creates a report/visualization based on the result set. As another example, the analytic data may be input by the user and provided directly from the application 145 to the DBMS 120 or the data store 110.

According to various embodiments, an application 145 and/or a service 135 may be used to perform line item matching of documents between a target system and a source system. The line item matching may be performed by a predictive model that is implemented via one or more services 135, applications 145, and the like.

Raw data (e.g., documents, tables, training data, etc.) from various sources may be stored in the data store 110. In this example, the application 145 and/or the service 135 performing the machine learning training may extract core features from the raw data and also derive features from the core features. The features may be stored as database tables within the data store 110. For example, a feature may be assigned to its own table with one or more columns of data. In one example, the features may be observed as numerical values. Furthermore, the application 145 and/or the service 135 may merge or otherwise combine features based on a vertical union function. In this example, the application 145 and/or the service 135 may combine features from a plurality of database tables into a single table which is then stored in the data store 110.

The services 135 executing on server 130 may communicate with DBMS 120 using database management interfaces such as, but not limited to, Open Database Connectivity (ODBC) and Java Database Connectivity (JDBC) interfaces. These types of services 135 may use SQL and SQL script to manage and query data stored in data store 110. The DBMS 120 serves requests to query, retrieve, create, modify (update), and/or delete data from database files stored in data store 110, and also performs administrative and management functions. Such functions may include snapshot and backup management, indexing, optimization, garbage collection, and/or any other database functions that are or become known.

Server 130 may be separated from or closely integrated with DBMS 120. A closely-integrated server 130 may enable execution of services 135 completely on the database platform, without the need for an additional server. For example, server 130 may provide a comprehensive set of embedded services which provide end-to-end support for Web-based applications. The services 135 may include a lightweight web server, configurable support for Open Data Protocol, server-side JavaScript execution and access to SQL and SQLScript. Server 130 may provide application services (e.g., via functional libraries) using services 135 that manage and query the database files stored in the data store 110. The application services can be used to expose the database data model, with its tables, views and database procedures, to clients 140. In addition to exposing the data model, server 130 may host system services such as a search service, and the like.

Data store 110 may be any query-responsive data source or sources that are or become known, including but not limited to a SQL relational database management system. Data store 110 may include or otherwise be associated with a relational database, a multi-dimensional database, an Extensible Markup Language (XML) document, or any other data storage system that stores structured and/or unstructured data. The data of data store 110 may be distributed among several relational databases, dimensional databases, and/or other data sources. Embodiments are not limited to any number or types of data sources.

In some embodiments, the data of data store 110 may include files having one or more of conventional tabular data, row-based data, column-based data, object-based data, and the like. According to various aspects, the files may be database tables storing data sets. Moreover, the data may be indexed and/or selectively replicated in an index to allow fast searching and retrieval thereof. Data store 110 may support multi-tenancy to separately support multiple unrelated clients by providing multiple logical database systems which are programmatically isolated from one another. Furthermore, data store 110 may support multiple users that are associated with the same client and that share access to common database files stored in the data store 110.

According to various embodiments, data (e.g., data records, data entries, documents, etc.) may be stored, modified, deleted, and the like, within the data store 110. As an example, data may be created, written, modified, or deleted based on instructions from any of the applications 145, the services 135, and the like. Each piece of data may be assigned a globally unique identifier (GUID) by an operating system, or other program of the database 100. The GUID is used to uniquely identify that data from among all other data stored within the database 100. GUIDs may be created in multiple ways including, but not limited to, random, time-based, hardware-based, content-based, a combination thereof, and the like.

The architecture 100 may include metadata defining objects which are mapped to logical entities of data store 110. The metadata may be stored in data store 110 and/or a separate repository (not shown). The metadata may include information regarding dimension names (e.g., country, year, product, etc.), dimension hierarchies (e.g., country, state, city, etc.), measure names (e.g., profit, units, sales, etc.) and any other suitable metadata. According to some embodiments, the metadata includes information associating users, queries, query patterns and visualizations. The information may be collected during operation of system and may be used to determine a visualization to present in response to a received query, and based on the query and the user from whom the query was received.

Each of clients 140 may include one or more devices executing program code of an application 145 for presenting user interfaces to allow interaction with application server 130. The user interfaces of applications 145 may comprise user interfaces suited for reporting, data analysis, and/or any other functions based on the data of data store 110. Presentation of a user interface may include any degree or type of rendering, depending on the type of user interface code generated by server 130. For example, a client 140 may execute a Web Browser to request and receive a Web page (e.g., in HTML format) from application server 130 via HTTP, HTTPS, and/or Web Socket, and may render and present the Web page according to known protocols.

One or more of clients 140 may also or alternatively present user interfaces by executing a standalone executable file (e.g., an .exe file) or code (e.g., a JAVA applet) within a virtual machine. Clients 140 may execute applications 145 which perform merge operations of underlying data files stored in data store 110. Furthermore, clients 140 may execute the conflict resolution methods and processes described herein to resolve data conflicts between different versions of a data file stored in the data store 110. A user interface may be used to display underlying data records, and the like.

Figure 2A:
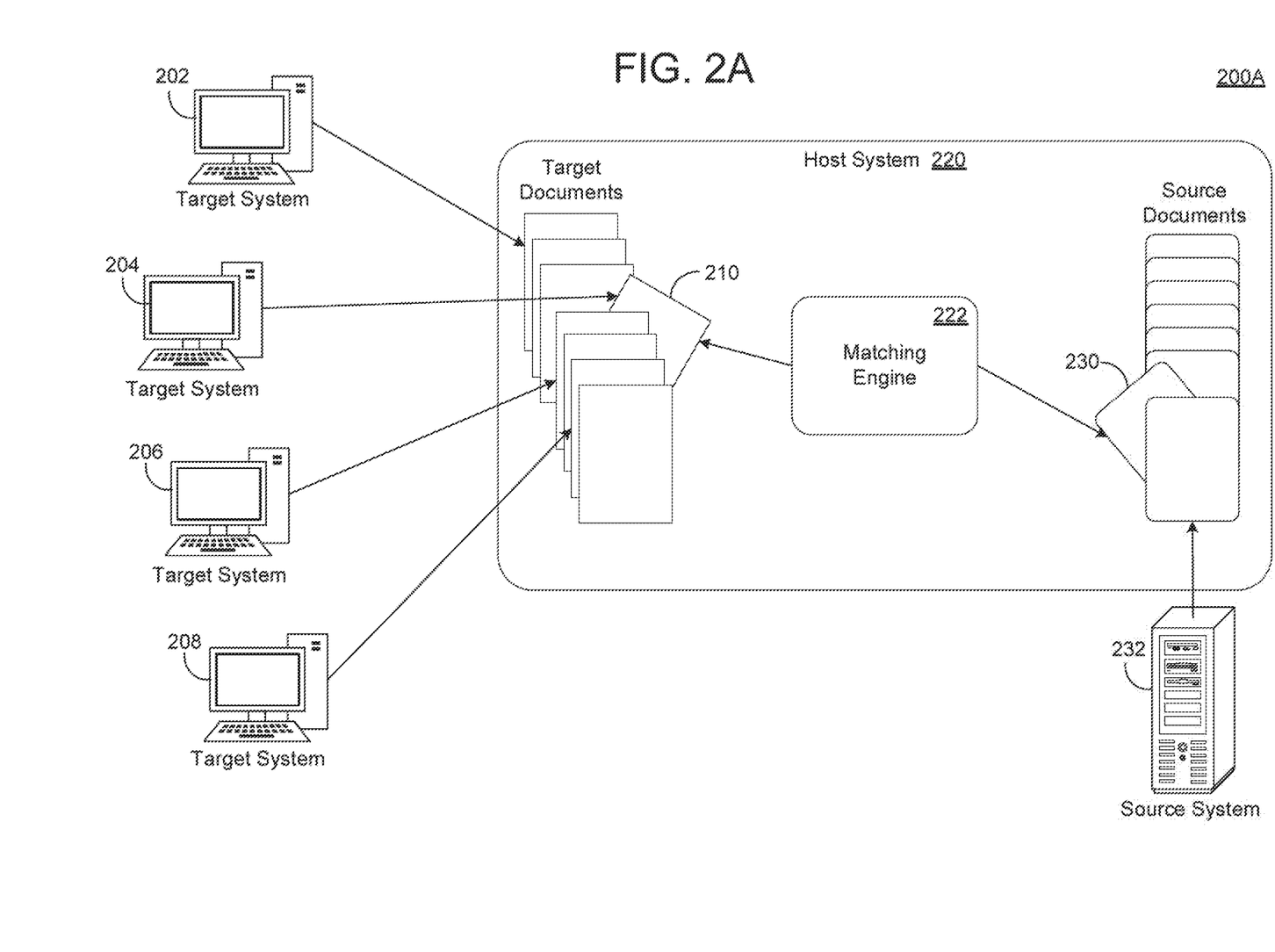
FIGS. 2A-2C are diagrams illustrating a process for performing line item matching between documents in accordance with example embodiments.
Figure 2B:
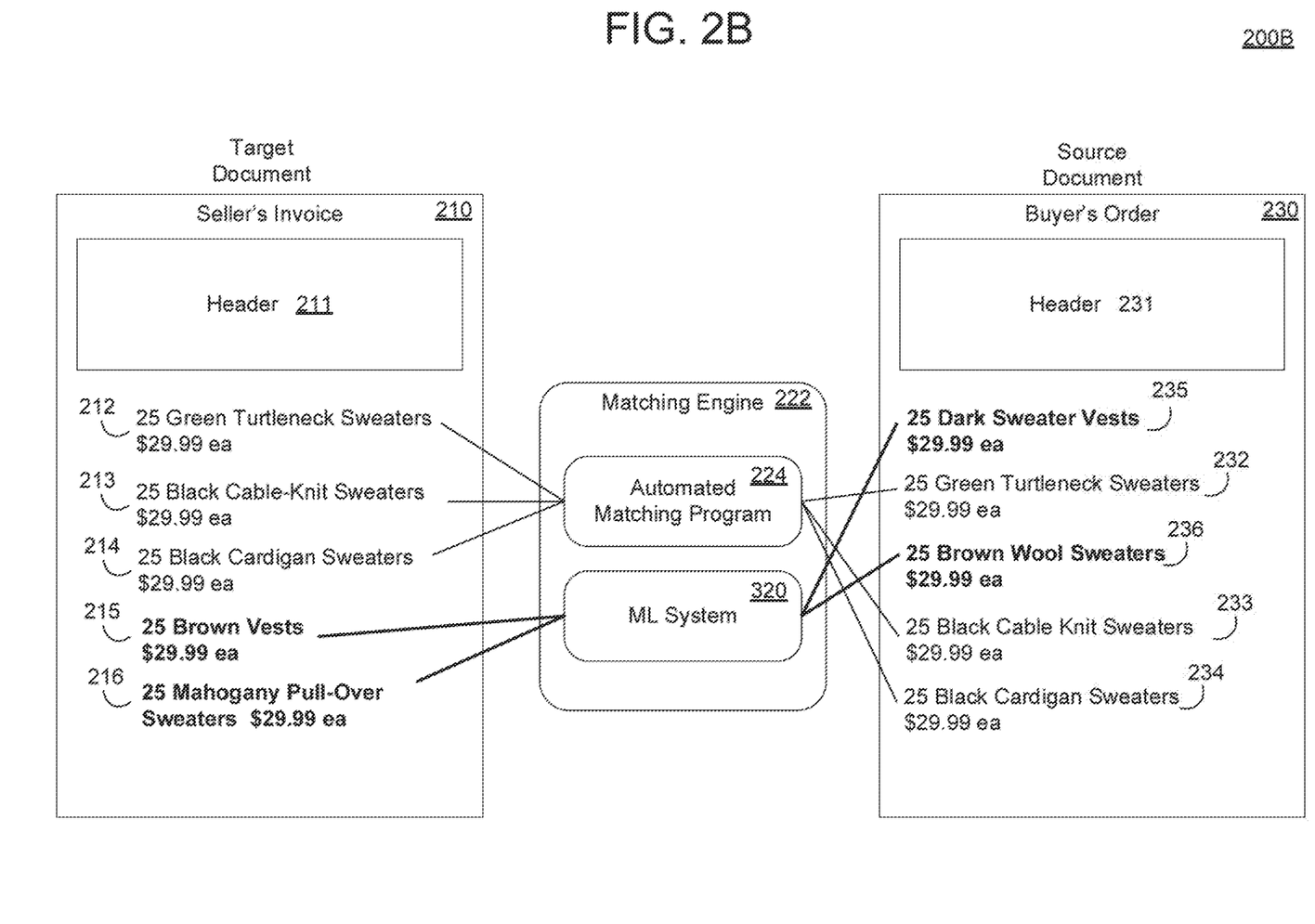
Figure 2C:
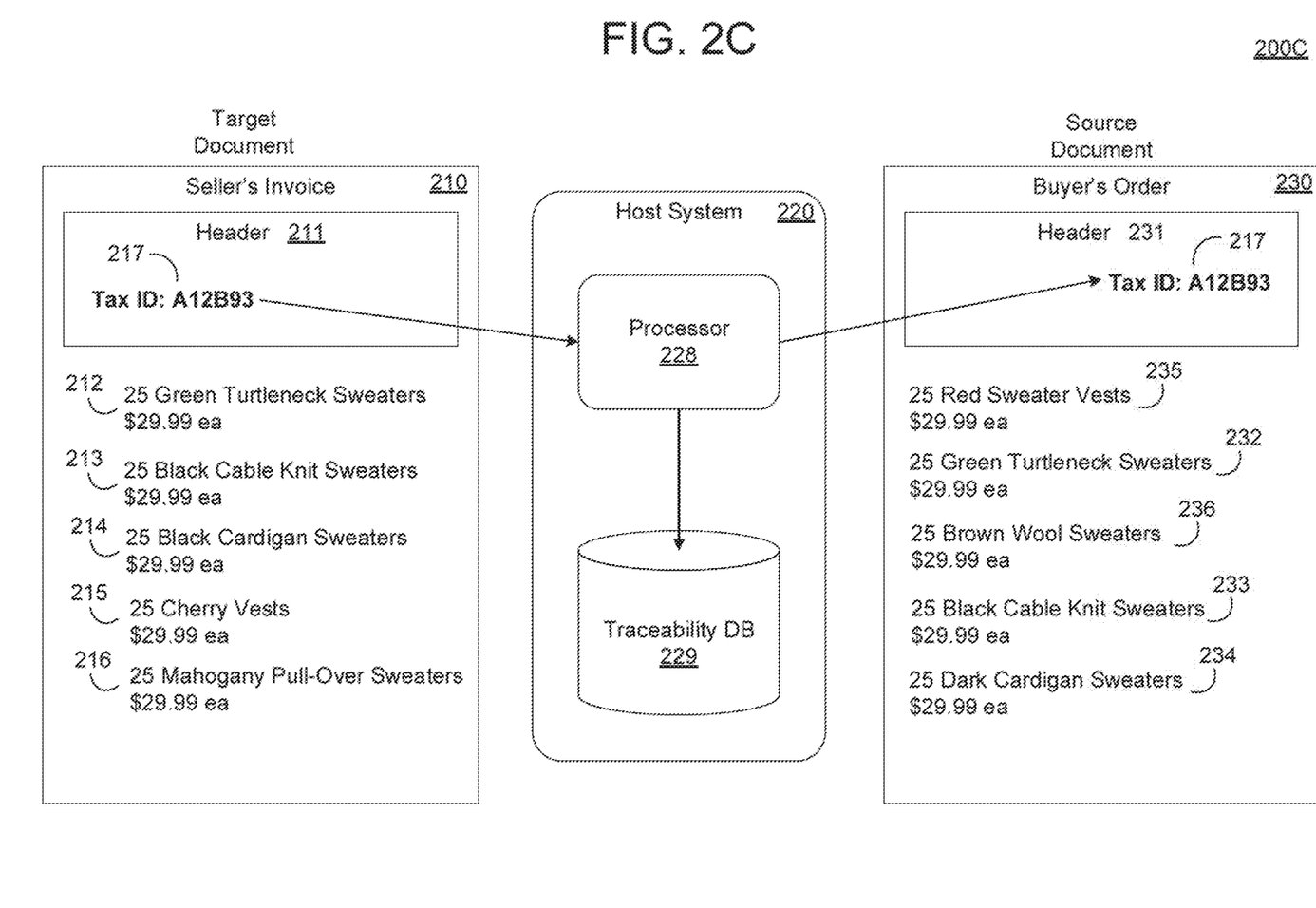

FIGS. 2A-2C are diagrams illustrating a process for performing line item matching between documents in accordance with example embodiments. FIG. 2A illustrates a process 200A of a host system 220 matching a target document 210 from one of the target systems 202, 204, 206, and 208, with a source document 230 of a source system 232. For example, the host system 220 may be a cloud platform, a web server, a database, a user device, a combination thereof, and the like. As another example, the target systems 202, 204, 206, and 208 may be servers, databases, cloud platforms, user devices, a combination thereof, or the like. As another example, the source system 232 may be a database, a server, a cloud platform, a user device, or the like. In one embodiments, the source system 232 is external from and remote to the host system 220. As another example, the source system 232 may be the same device or incorporated into the same platform as the host system 220 (e.g., both stored on the same database, cloud platform, web server, etc.)

As a non-limiting example, the source system 232 may correspond to a buyer's system, and the target systems 202, 204, 206, and 208, may correspond to the systems of different sellers or agents thereof, however, embodiments are not limited thereto. In this example, the incoming target document 210 may be an e-invoice that is stored in a data store (invoice journal, etc.) of the host system 220 and uploaded thereto by one of the target systems 202, 204, 206, and 208. As another example, the source document 230 may be a purchase order, tax document, document, or some other record of the buyer that must be matched to the target document 210 for legal reasons (e.g., tax purposes, etc.) For example, the target document 210 may be an extensible markup language (XML) document while the source document 230 is a purchase order in a native format of an ERP application that tracks the movement of goods (MIGO, MIRO, etc.), however, embodiments are not limited thereto.

Upon receiving the target document 210, a matching program 222 may match the target document 210 to its corresponding source document 230. Both of the target document 210 and the source document 230 may include a plurality of line items corresponding to a plurality of sales transactions. In some cases, the target document 210 may be generated with a different format and different data fields, descriptions, etc., than the source document 230. Common reasons for this is that the target document 210 and the source document 230 may be generated by different software programs with different purposes (e.g., invoicing software that complies with tax regulations versus an accounting software the complies with accounting regulations).

In this case, the two documents can be matched using identifiers in each of the two documents. For example, as shown in FIG. 2B, a header 211 of the target document 210 may include an identifier of invoice, an identifier of the buyer and/or the seller, a date, a signature of the seller, a quantity, a tax number or other tax identifier, etc. Likewise, a header 231 of the source document 230 may contain one or more of the same fields that enable a match to be detected between the target document 210 and the source document 230. In this case, by match, the target document 210 and the source document 230 refer to the same batch of transactions between a buyer and a seller. Next, the matching program 222 may attempt to match the individual lines between the target document 210 and the source document 230.

Starting in 2020, Russia requires that the information from the lines of e-invoices to be included in a Value Added Tax (VAT) declaration. Previously, only the information from the e-invoice header was required for VAT reporting. Thus, the lines of the received target document 210 must be associated with the lines of the corresponding source document 230 in an ERP system of the source system.

However, it can be difficult to perform automatic line-matching between an e-invoice and an internal ERP document/record for various reasons, including because received e-invoices mostly do not contain references to documents in the ERP system. For example, the lines of the electronic invoice do not contain a material code used in the receiving ERP system, and therefore it is not possible to link the invoice line to the purchase order line or the receipt document. As another example, receiving e-invoices without having a referenced document like a purchase order (PO) can cost the accounts payable department a lot of time, as the employees have to input the required information manually. Even for supplier invoices with references, the supplier might order line items in a different order, have split them or send partial invoice compared to the purchase order, be in a different language (e.g., for international purchase orders), and the like. Furthermore, even for supplier invoices with references and matching number of line items between PO and supplier invoice, the line items quantities might be different from the goods receipt or from the purchase order.

Referring again to FIG. 2B, the matching engine 222 may perform a two-step matching process. Initially, a direct/exact match between lines of the target document 210 and the source document 230 may be performed by an automated matching program 224. The matching in this first step may be performed for identical line items or line items have known replacement terms (e.g., vehicle vs. automobile, etc.) In this case, all of the lines may be matched between each of the two documents. As a result, the program can terminate. However, if the automated matching program 224 cannot match some or all of the lines (e.g., a set of lines, a subset of lines, etc.), the host platform 220 may invoke execution of a machine learning (ML) system 320 which can use machine learning to predict matches between remaining lines of the target document 210 and the source document 230.

For example, the automated matching program 224 may match two lines in between the target document 210 and the source document 230 based on various attributes. Automated matching may be performed if the amount of line items in the target document 210 is the same as in the source document 230 (and in a same order) with some user-defined tolerance, lines between the target document 210 and the source document 230 include a quantity and a measure or amount of the unit are the same, there are no other incoming invoices in the line item purchase history, the VAT rate is the same, there is only one match that satisfies predefined conditions, and the like. If one or more of these initial conditions are not present, it might be difficult for the automated matching program 224 to perform the matching. In this case, the ML system 320 can be invoked.

For example, if there are several lines that cannot be matched (i.e. there is M:N remaining lines, for example 2:2, 3:3, 4:3, etc.), the ML system 320 may be applied in order to find the best possible matching based on the line item description. The ML system 320 may include a machine learning model that is trained based on the cases of successful line item matching (by the predefined algorithm), as further described in the examples of FIGS. 3A-3C.

In the example of FIG. 2B, the target document 210 includes line items 212, 213, 214, 215, and 216, corresponding to different transactions (e.g., MIGO, MIRO, etc.). Likewise, the source document 230 includes line items 232, 233, 234, 235, and 236 corresponding to the same transactions but in different order, and in different terminology. In this case, the automated matching program 224 is able to match line item 212 to line item 232, line item 213 to line item 233, and line item 214 to line item 234. However, the automated matching program 224 is unable to match the last two line items 215 and 216 in the target document 210 and the two line items 235 and 236 in the source document 230. Thus, each of the target document 210 and the source document 230 have a remaining set (or subset) of lines to be matched.

In response, the host platform 220 may invoke the ML system 320 to resolve any remaining line items. Here, the ML system 320 may include one or more machine learning models (e.g., a Bayes classifier, etc.) that can identify matches based on descriptions included in each of the remaining line items. The ML system 320 is able to match line item 215 to line item 235, and line item 216 to line item 236. Prior to finalizing the matches, the ML system 320 may generate a likelihood (e.g., a confidence value) of the match and output the information about the match and the confidence value to a user (e.g., an administrator, etc.) for final approval, however, this step is not required.

Referring to FIG. 2C, upon completion of the ML system 320 matching process, a processor 228 of the host platform 220 may update a traceability database 229 of the host platform 220 with information about the matched line items. For example, the traceability database 229 may store a record of the source document 230 being matched with the target document 210, as well as the line-by-line matches between the source document 230 and the target document 210. The matches may include the content that is used to create the match such as material number, quantity, measure number, keywords from the description, and the like. In addition, the processor 228 may update the source document 230 to include information of the target document 210, for example, a tax identifier 217 of the target document 210 may be added to the header 230 of the source document 230, but embodiments are not limited thereto. Other data values may be extracted from the target document 210 and added to the source document 230 including header values, line values, signatures, and the like. By linking the two documents together, the host platform 220 can easily retrieve both the source document 230 and the linked target document 210, if necessary (e.g., for an audit, user review, etc.)

Figure 3A:
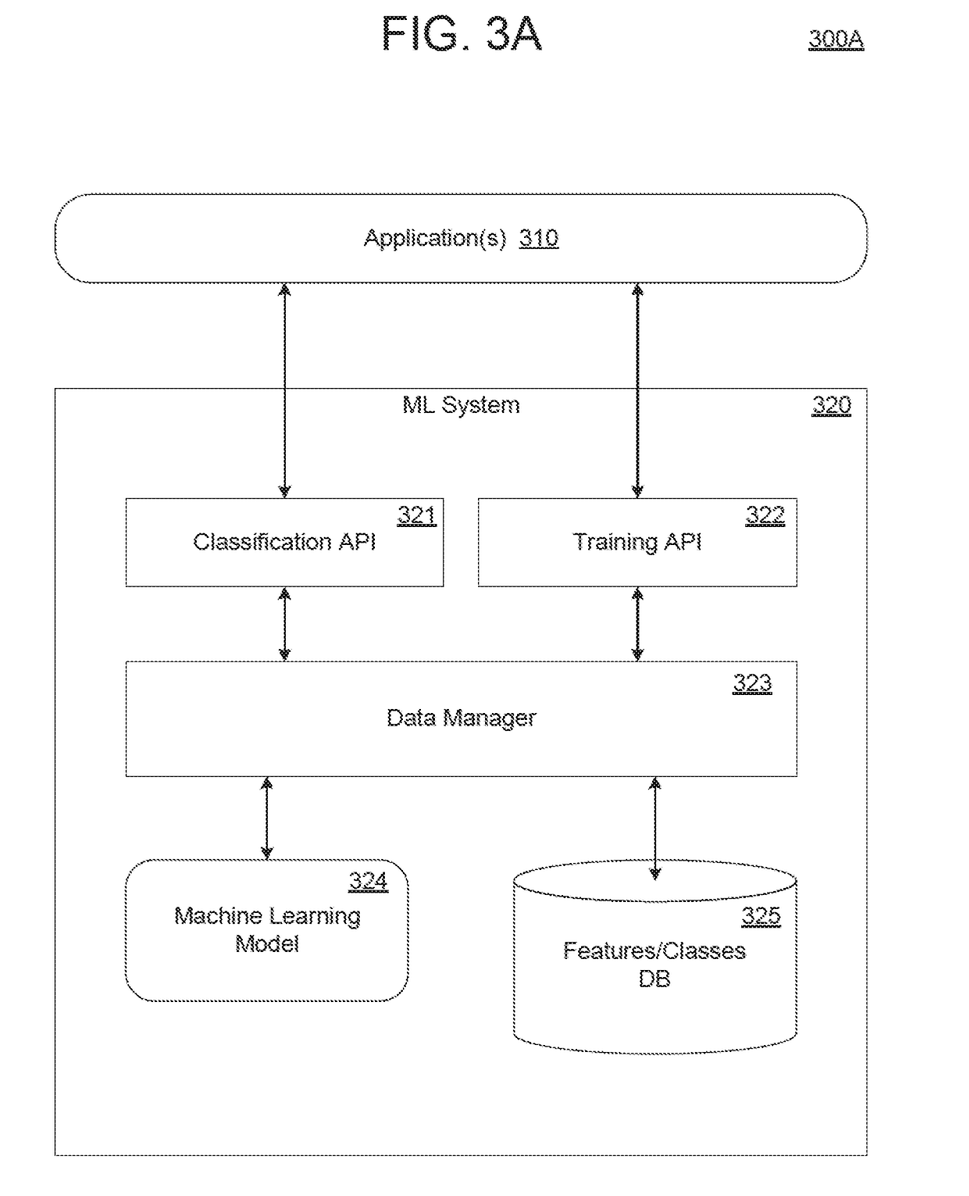
FIG. 3A is a diagram illustrating an architecture for training and executing a machine learning algorithm in accordance with an example embodiment.
Figure 3B:
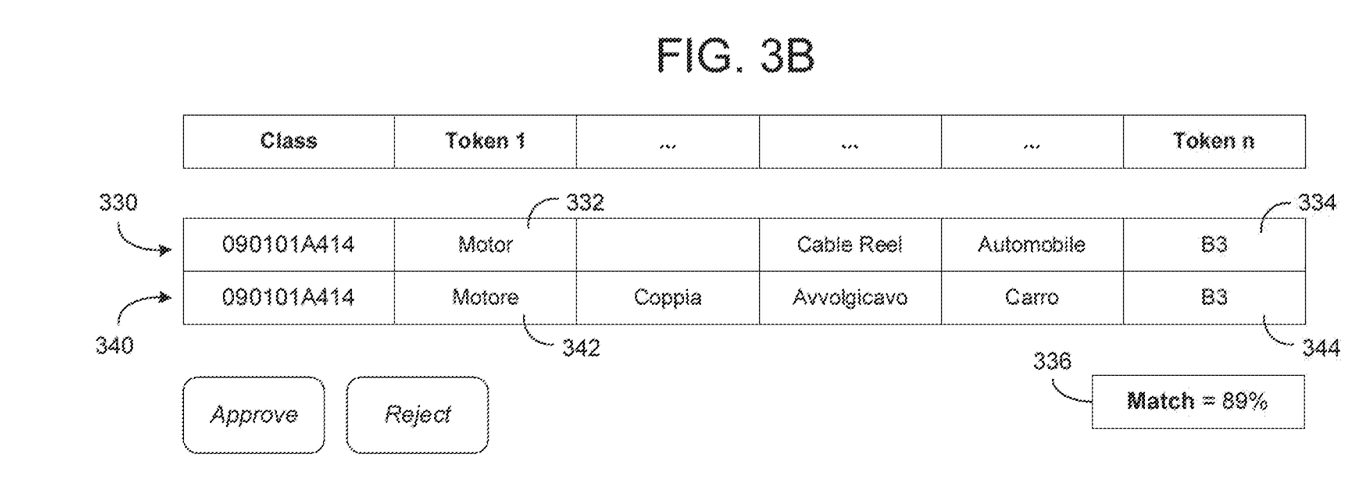
FIGS. 3B-3C are diagrams illustrating matches between line items in accordance with example embodiments.
Figure 3C:
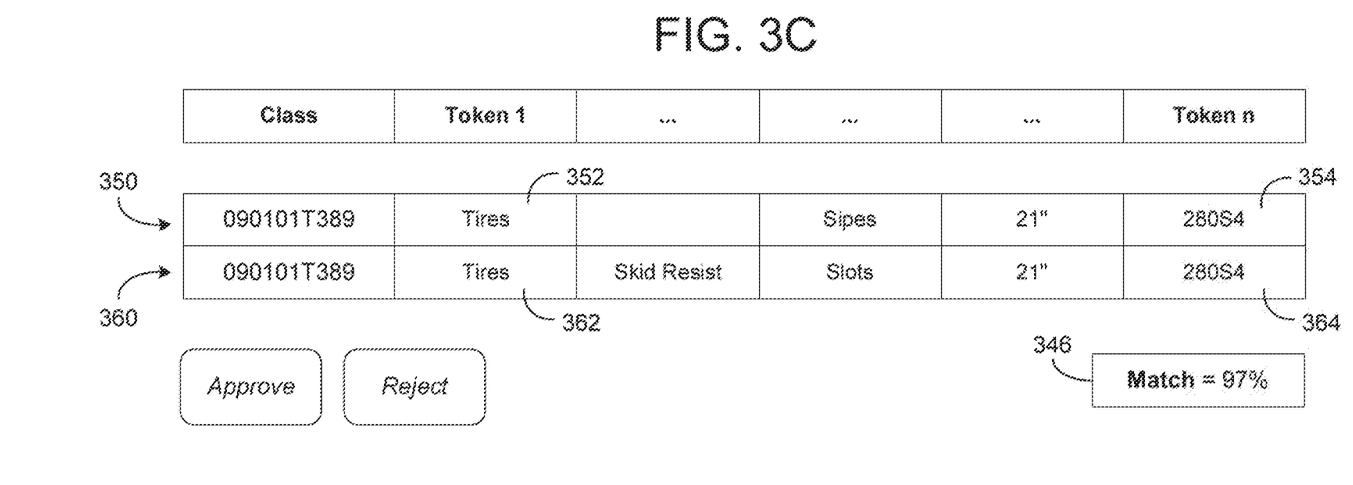

FIG. 3A illustrates an architecture 300A for training and executing a machine learning algorithm in accordance with an example embodiment, and FIGS. 3B-3C illustrate matches between line items in accordance with example embodiments. Referring to FIG. 3A, the host platform 220 shown in FIG. 2A, may implement a machine learning system 320 which manages the predictive matching. Meanwhile, applications 310 (e.g., ERP applications, etc.) may use the predictive matching to perform line-by-line matching between documents. In this example, the ML system 320 includes a classification application programming interface (API), a training API, a data manager 323, a machine learning model 324, and a database 325 which can store known features of a source system and/or a target system when performing matching.

In a predictive process, an application 310 may call the ML system 320 to perform predictive matching for a set of lines between a target document and a source document. The call may be an API call to the classification API 321. In this case, the classification API 321 may receive a set of labeled text descriptions (of lines to be compared) and an optional difference threshold which indicates a minimum matching confidence that must be achieved. If this threshold is not set, only the class with the highest probability is returned. It may also take a list of possible material numbers which may be included on the purchase order that corresponds to the invoice. The system knows that the result must be one of these.

The data manager 323 then invokes the machine learning model 324 to perform line-by-line predictions on the different sets of lines from the target document and the source document. In response, the ML model 324 returns a set of ordered lists of matches and their probabilities under the same labels. The labels are arbitrary and set by the sender, and simply serve to make identification possible. The results are then forward from the data manager 323 to the application 310 via the classification API 321. In some embodiments, before the results are provided to the application, a result may be flagged for review. When the review is completed (e.g., by an admin, etc.), the match can be forwarded to the application 310.

As one example, the machine learning model 324 may perform a text classification and use a multinomial naïve Bayes classifier, with the assumption of equiprobable classes. As one example, the assumption may be a priori likelihood for each material number to occur is the same. The machine learning model 324 may include a classifier algorithm that is normally described as identifying classes based on their features. In the example embodiments, line item identifiers such as material numbers or the like may be the classes, and the features may be the textual descriptions within the line item which are decomposed into words or tokens. The machine learning result may be determined by a smoothed maximum likelihood.

Depending on the setup of a customer system (such as a buyer or a seller), the electronic document may contain items in several languages. The machine learning model 324 can adapt to a multi-lingual environment because the machine learning model 324 can be language-agnostic. In this case, features in another language may be added to the features of a class in a different language. Due to the nature of a Bayes classifier, any feature that is part of a class will contribute to its identification, no matter the language. In effect, this approach is multi-lingual, or language-agnostic. As a result, identification of the language of a line item is not necessary.

In addition to these benefits, the machine learning model 324 may exploit the line items that can be matched using the automated matching of the first step. In this case, the machine learning model 324 does not need to evaluate the entire set of known line items (and material numbers stored in the database 325) for a candidate, but only those that are on the source document. This improves both performance and accuracy by reducing the candidates used for matching in the database 325 and thus reducing the inputs into the machine learning model 324. For example, if a source document includes 100 line items, and the host system can automatically match 80 of the 100 lines with corresponding lines in a target document, the ML system 320 only needs to map the remaining 20 lines. In this case, the data manager 323 may identify material number values (or some other identifier) of the lines remaining in the source document that need to be matched, and remove all other possible material numbers from the database 325 during the matching process. In this example, the database may have 10000 possible line items, but be reduced down to 20 by the reduction performed by the database manager 323. This reduced amount of "candidates" from the database 325 can be input into the machine learning model 324 along with the lines in the source and the target documents, and the matching may be performed. In doing so, the machine learning model can reduce the amount of data that needs to be executed.

Initially, the machine learning model 324 may learn all available material numbers and their descriptions in all languages available in the source system (which may be stored in the database 325). However, a problem may exist because descriptions in the target system may not correspond to the descriptions in the source system, and may contain words or even languages that have no correspondence with the a priori available descriptions, which affects the accuracy of the results and implies the need for a learning algorithm. To address these issues, the ML system 320 may continue to learn during runtime.

For example, any matching line items identified without the help of machine learning may be passed as a set of (material number, text from the invoice) to the classifier for learning. In response, the machine learning model 324 may decompose the text into tokens and add them as new features to the material number in the database 325. By continuously training the machine learning model 324 with this approach, the accuracy of the machine learning model 324 can be improved and can adjust to changes in wordings that naturally occur over time. In repeated dealings with the same customer the chance increases that a line item that cannot be identified with the non-machine learning algorithm on one invoice was already learned on a previous invoice, and can be identified with high accuracy by the machine learning model 324. In this example, the training API 322 may take as input a set of line items, i.e. material numbers and their descriptions. Data passed into the training API 322 may be appended to the respective classes in the database 325 via the data manager 323. The data manager 323 may be responsible for handling all incoming and outgoing data requests, managing the class/features in the database 325, and preparing the request for the machine learning model 324 (in particular, assembly of the potential targets).

The result of this system is the bi-furcation of line matching. Any item that the automated matching algorithm cannot identify will be passed to the machine learning model 324 for classification. In response, the machine learning model 324 may return a list of results, ordered by probability to the application 310 where the matching is needed. Criterion to inclusion in the set is that the difference in probability between each item and the one with the highest probability does not exceed a configurable threshold.

A processed document (such as an invoice) should not contain errors, however, the option to review results may be provided. The ML system 320 may implement a review process or it may be a fully automated ML process. In some cases, the system may achieve a high enough accuracy that in most cases the review just needs to confirm or no review at all. As another example, in case of full automation the item with the highest probability is used as a match without review. For example, the machine learning model 324 may receive a list of possible material numbers, together with the items that need to be classified. The list of possible material numbers is simply the set of material numbers from the purchase order for which the line items of the VAT invoice cannot be identified with the automated matching algorithm. It will only work on this set of possible material numbers. On the technical side, that means that the list of relative frequencies is calculated anew for each classification request, and a global feature frequency count is not maintained (nor does it need to be).

FIGS. 3B-3C are diagrams illustrating a display/output of matches between line items in accordance with example embodiments. Referring to FIG. 3B, a line item 330 from a target document is matched to a line item 340 from a source document. Here, the system may display the content (e.g., tokens from the description) along with corresponding matched content between both of the line items 330 and 340. Based on the classes and features stored in the database 325 (in FIG. 3A), the ML system 320 may apply weights to the tokens based on how frequently the tokens are used in the source system. For example, the source system may be a buyer of motors for automobiles. In this case, many of the line items in their database may be related to motors. Therefore, the matching tokens 332 and 342 (i.e., motor and motore) may not be given very much weight by the machine learning algorithm 324. However, the me matching of tokens 334 and 344 (i.e., B3 and B3) may be given more weight by the machine learning algorithm 324 because the term "B3" is only used twice in the entire database. In addition to providing the line item content in the form of a string of tokens, the system may provide a confidence value 336 and the class number (material number, code, etc.) of the line items. The system may also provide a user with the ability to review the match with an approve or a reject button.

FIG. 3C illustrates another example in which the ML system 320 matches line item 350 from a target document to line item 360 from a source document. In this example, the matching of tokens 352 and 362 (i.e., tires to tires) may be given less weight by the machine learning model 324 than the matching of tokens 354 and 364 (i.e., 280S4 to 280S4) because tires is used numerous times in the source database while 280S4 is only used once. It's still not a perfect match though, as noted by the confidence score 346, because there could be other line items that have the same tokens.

Figure 4A:
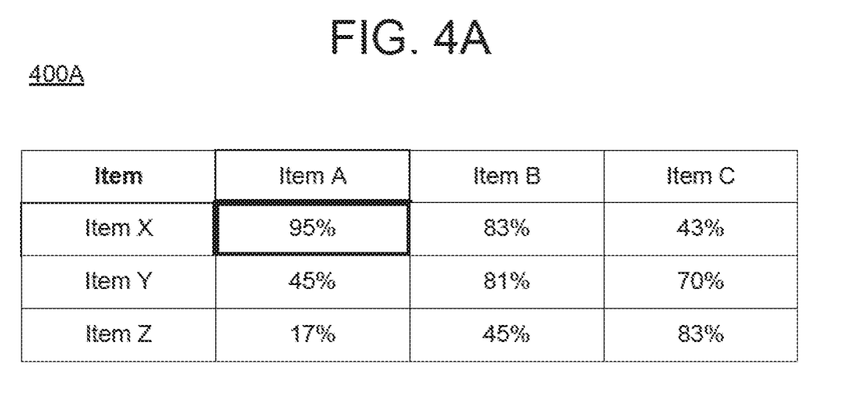
FIGS. 4A-4B are diagrams illustrating a process of resolving line item matching conflicts in accordance with example embodiments.
Figure 4B:
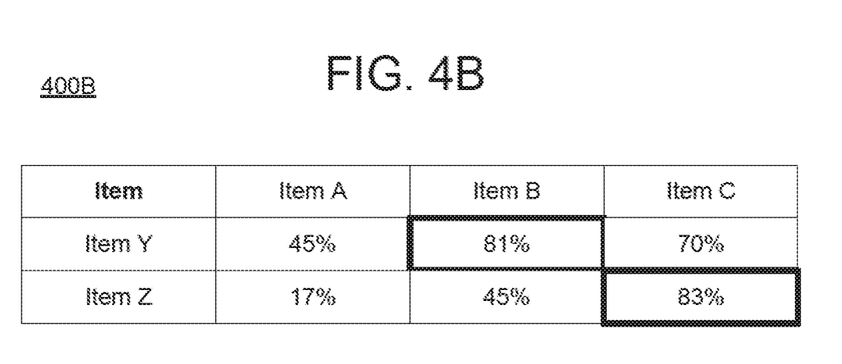

FIGS. 4A-4B illustrate processes 400A and 400B for resolving line item matching conflicts in accordance with example embodiments. Referring to FIG. 4A, as shown in the matching table 400A, three line items A, B, and C, from a target system are being matched to three line items X, Y, and Z of a source system. In this case, line item B could be matched to both item X and item Y. In this case, simply choosing the maximum likelihood would result in item X being matched to both item A and item B, which is not possible. In this case, the system may perform conflict resolution.

The system may implement a boundary condition that each unidentified material number (line item) must be assigned exactly once. For all invoice line items that are remaining, the system may assign the one with the absolute highest probability first. In case of exactly identical probabilities the assignment is random. In FIG. 4A, the highest probability is 95% between line item A and line item X. Thus, these two can be assigned to each other and removed from consideration. Next, the system looks at the second highest probability that is remaining and assigns the two as a match. In FIG. 4B, the next highest match is 81% (now that 83% has been removed). Accordingly, item B is assigned to item Y, and the remaining items (item C and item Z) can be matched. This process continues/repeats until all items are assigned.

Figure 5:
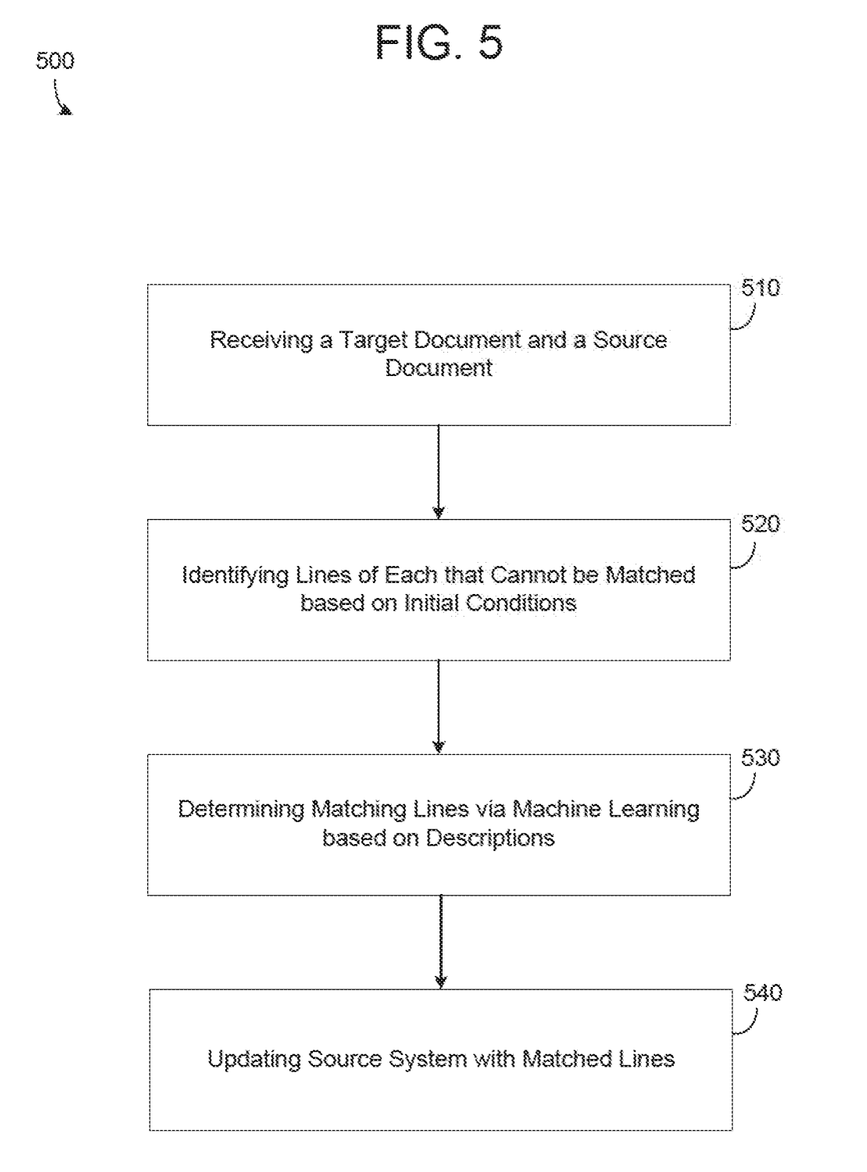
FIG. 5 is a diagram illustrating a method of line item matching between documents in accordance with an example embodiment.

FIG. 5 illustrates a method 500 of line item matching between documents in accordance with an example embodiment. For example, the method 500 may be performed by a database node, a cloud platform, a server, a computing system (user device), a combination of devices/nodes, or the like. Referring to FIG. 5, in 510, the method may include receiving a target document from a target system and a source document from a source system which are linked. As an example, the target document may be one of an electronic invoice or a purchase order, but embodiments are not limited thereto. Likewise, the source document may be one of an electronic invoice or a purchase order, but embodiments are not limited thereto. Other records include database files, tabular data, documents, and the like. In some embodiments, the target document may include an extensible markup language (XML) file and the source document comprises a native format of a software application such as an ERP application.

In 520, the method may include identifying a set of lines in the target document and a set of lines in the source document which cannot be matched based on initial conditions. Here, the method may attempt to match the lines from the target document to the source document on a line-by-line basis based on features such as quantity, number of units, material codes, descriptions, and the like. For any lines that the method cannot match, the lines may be reserved. In some embodiments, the identifying may include identifying the set of lines in the source document based on object descriptions in the source document that do not have exact matches in the target document, and identifying the set of lines in the target document based on object descriptions in the target document that do not have exact matches in the source document.

In 530, the method may include determining, via a machine learning model, a target line from the identified set of lines in the target document matches a source line from the identified set of lines in the source document based on descriptions included in the target line and the source line. As an example, the machine learning model may include a Bayes classifier that provides weightings to different words (tokens) within the description based on a database of words known from the source system and/or the target system. In 540, the method may include updating the source system to indicate that the line from the target document and the line from the source documents are a match.

In some embodiments, the method may further include reducing candidates for matching in the target system and candidates for matching in the source system that are input into the machine learning model based on matched lines included in the target document and the source document, prior to performing the determining. In some embodiments, the machine learning model may include a language-agnostic text-based classification model such as a Bayes classifier. In some embodiments, the method may further include training the machine learning model based on a target line and a source line matched by the machine learning model. In some embodiments, the machine learning model may apply weights to terms in the description of the source line based on a frequency of use of the terms in object descriptions in the source system. In some embodiments, the updating may include adding an identifier value from the target document into a record of the source document in the source system.

Figure 6:
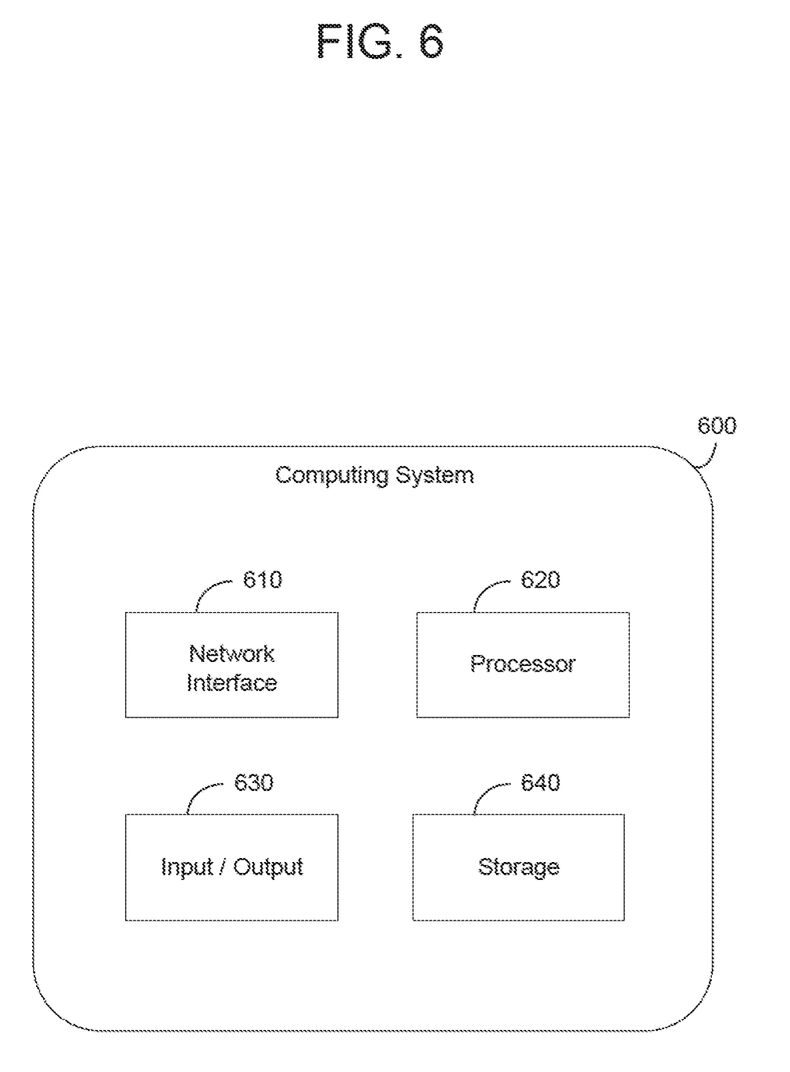
FIG. 6 is a diagram illustrating a computing system for use in the examples herein in accordance with an example embodiment.

FIG. 6 illustrates a computing system 600 that may be used in any of the methods and processes described herein, in accordance with an example embodiment. For example, the computing system 600 may be a database node, a server, a cloud platform, or the like. In some embodiments, the computing system 600 may be distributed across multiple computing devices such as multiple database nodes. Referring to FIG. 6, the computing system 600 includes a network interface 610, a processor 620, an input/output 630, and a storage device 640 such as an in-memory storage, and the like. Although not shown in FIG. 6, the computing system 600 may also include or be electronically connected to other components such as a display, an input unit(s), a receiver, a transmitter, a persistent disk, and the like. The processor 620 may control the other components of the computing system 600.

The network interface 610 may transmit and receive data over a network such as the Internet, a private network, a public network, an enterprise network, and the like. The network interface 610 may be a wireless interface, a wired interface, or a combination thereof. The processor 620 may include one or more processing devices each including one or more processing cores. In some examples, the processor 620 is a multicore processor or a plurality of multicore processors. Also, the processor 620 may be fixed or it may be reconfigurable. The input/output 630 may include an interface, a port, a cable, a bus, a board, a wire, and the like, for inputting and outputting data to and from the computing system 600. For example, data may be output to an embedded display of the computing system 600, an externally connected display, a display connected to the cloud, another device, and the like. The network interface 610, the input/output 630, the storage 640, or a combination thereof, may interact with applications executing on other devices.

The storage device 640 is not limited to a particular storage device and may include any known memory device such as RAM, ROM, hard disk, and the like, and may or may not be included within a database system, a cloud environment, a web server, or the like. The storage 640 may store software modules or other instructions which can be executed by the processor 620 to perform the method shown in FIG. 5. According to various embodiments, the storage 640 may include a data store having a plurality of tables, records, partitions and sub-partitions. The storage 640 may be used to store database records, documents, entries, and the like.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
    a storage configured to store a target document from a target system and a source document from a source system which are linked; and
    a processor configured to
        identify a set of lines in the target document and a set of lines in the source document which cannot be matched based on initial conditions,
        determine, via a machine learning model, that a target line from the identified set of lines in the target document matches a source line from the identified set of lines in the source document based on descriptions included in the target line and the source line, and
        update the source system to indicate that the target line from the target document and the source line from the source document are a match.

2. The computing system of claim 1, wherein the processor is configured to identify the set of lines in the source document based on object descriptions in the source document that do not have exact matches in the target document, and identify the set of lines in the target document based on object descriptions in the target document that do not have exact matches in the source document.

3. The computing system of claim 1, wherein the processor is further configured to reduce objects in the target system and objects in the source system that are input into the machine learning model based on matched lines included in the target document and the source document, prior to performing the determining.

4. The computing system of claim 1, wherein the machine learning model comprises a language-agnostic text-based classification model.

5. The computing system of claim 1, wherein the processor is further configured to train the machine learning model based on the target line and the source line matched by the machine learning model.

6. The computing system of claim 1, wherein the machine learning model applies weights to terms in a description of the source line based on a frequency of use of the terms in object descriptions in the source system.

7. The computing system of claim 1, wherein the processor is configured to add an identifier value from the target document into a record of the source document in the source system.

8. The computing system of claim 1, wherein the target document comprises an extensible markup language file and the source document comprises a native format of a software application.

9. A method comprising:
    receiving a target document from a target system and a source document from a source system which are linked;
    identifying a set of lines in the target document and a set of lines in the source document which cannot be matched based on initial conditions;
    determining, via a machine learning model, a target line from the identified set of lines in the target document matches a source line from the identified set of lines in the source document based on descriptions included in the target line and the source line; and
    updating the source system to indicate that the target line from the target document and the source line from the source document are a match.

10. The method of claim 9, wherein the identifying comprises identifying the set of lines in the source document based on object descriptions in the source document that do not have exact matches in the target document, and identifying the set of lines in the target document based on object descriptions in the target document that do not have exact matches in the source document.

11. The method of claim 9, further comprising reducing objects in the target system and objects in the source system that are input into the machine learning model based on matched lines included in the target document and the source document, prior to performing the determining.

12. The method of claim 9, wherein the machine learning model comprises a language-agnostic text-based classification model.

13. The method of claim 9, further comprising training the machine learning model based on the target line and the source line matched by the machine learning model.

14. The method of claim 9, wherein the machine learning model applies weights to terms in a description of the source line based on a frequency of use of the terms in object descriptions in the source system.

15. The method of claim 9, wherein the updating comprises adding an identifier value from the target document into a record of the source document in the source system.

16. The method of claim 9, wherein the target document comprises an extensible markup language file and the source document comprises a native format of a software application.

17. A non-transitory computer-readable medium comprising instructions which when read by a processor cause a computer to perform a method comprising:

receiving a target document from a target system and a source document from a source system which are linked;

identifying a set of lines in the target document and a set of lines in the source document which cannot be matched based on initial conditions;

determining, via a machine learning model, a target line from the identified set of lines in the target document matches a source line from the identified set of lines in the source document based on descriptions included in the target line and the source line; and updating the source system to indicate that the target line from the target document and the source line from the source document are a match.

18. The non-transitory computer-readable medium of claim 17, wherein the identifying comprises identifying the set of lines in the source document based on object descriptions in the source document that do not have exact matches in the target document, and identifying the set of lines in the target document based on object descriptions in the target document that do not have exact matches in the source document.

19. The non-transitory computer-readable medium of claim 17, wherein the method further comprises reducing objects in the target system and objects in the source system that are input into the machine learning model based on matched lines included in the target document and the source document, prior to performing the determining.

20. The non-transitory computer-readable medium of claim 17, wherein the method further comprises training the machine learning model based on the target line and the source line matched by the machine learning model.

* * * * *